(12) United States Patent
Salerno (10) Patent No.: US 10,688,465 B2
(45) Date of Patent: Jun. 23, 2020

(54) METHOD AND APPARATUS TO INFUSE WATER WITH NITRATE ($NO_3$) AND NITRITE ($NO_2$) USING ELECTRICAL PLASMA FOR USE IN PLANT FERTILIZATION

(71) Applicant: Mark Salerno, Huntington, NY (US)

(72) Inventor: Mark Salerno, Huntington, NY (US)

( * ) Notice: Subject to any disclaimer, the term of this patent is extended or adjusted under 35 U.S.C. 154(b) by 358 days.

(21) Appl. No.: 15/702,994

(22) Filed: Sep. 13, 2017

(65) Prior Publication Data

US 2018/0071707 A1 Mar. 15, 2018

Related U.S. Application Data

(60) Provisional application No. 62/394,377, filed on Sep. 14, 2016.

(51) Int. Cl.
*B01J 19/08* (2006.01)
*B01F 3/04* (2006.01)
(Continued)

(52) U.S. Cl.
CPC ......... *B01J 19/088* (2013.01); *B01F 3/04014* (2013.01); *B01F 3/04056* (2013.01); *B01F 3/04737* (2013.01); *C01B 21/203* (2013.01); *C05C 5/00* (2013.01); *C05C 11/00* (2013.01); *C05G 5/20* (2020.02); *B01F 2003/04921* (2013.01); *B01F 2215/008* (2013.01); *B01F 2215/0055* (2013.01); *B01J 2219/083* (2013.01); *B01J 2219/0809* (2013.01); *B01J 2219/0869* (2013.01); *B01J 2219/0875* (2013.01); *B01J 2219/0894* (2013.01)

(58) Field of Classification Search
None
See application file for complete search history.

(56) References Cited

U.S. PATENT DOCUMENTS 3,623,265 A 11/1971 Brunton et al. ................ 47/1.3
4,010,897 A 3/1977 Treharne et al. ................ 239/8
(Continued)

OTHER PUBLICATIONS

Notification of Transmittal of the International Search Report and the Written Opinion of the International Searching Authority, or the Declaration, in English, dated Jan. 12, 2018, which was issued by the International Bureau of WIPO in Applicant's corresponding international PCT application having Serial No. PCT/US2017/051301, filed on Sep. 13, 2017.
(Continued)

*Primary Examiner* — Kishor Mayekar
(74) *Attorney, Agent, or Firm* — Bodner & O'Rourke, LLP; Gerald T. Bodner; Christian P. Bodner (57) ABSTRACT

A nitrogen-enriched water generator includes an elongated housing defining a sealed nitrogen/oxygen chamber in which nitrogen molecules are combined with oxygen molecules to form a nitrate ($NO_3$) or a nitrite ($NO_2$) gas (NOx gas). The housing includes an NOx gas and water mixing tube, a plasma generator and a nitrogen-enriched water trap. A water spray nozzle sprays water into the chamber. At least one air injection port injects air into the chamber. A vacuum port removes a volume of NOx gas not absorbed by the water from the sealed nitrogen/oxygen chamber.

31 Claims, 5 Drawing Sheets

(51) Int. Cl.
    *C05C 5/00*         (2006.01)
    *C05C 11/00*      (2006.01)
    *C05G 3/00*        (2020.01)
    *C01B 21/20*      (2006.01)
    *C05G 5/20*        (2020.01)

(56) References Cited

U.S. PATENT DOCUMENTS

| | | | |
|---|---|---|---|
| 4,141,715 A | 2/1979 | Wyse et al. | 71/58 |
| 4,297,123 A | 10/1981 | Wyse et al. | 71/58 |
| 4,427,434 A | 1/1984 | Eastin | 71/54 |
| 4,451,436 A | 5/1984 | O'Hare | 422/186.29 |
| 2013/0205657 A1 | 8/2013 | Keller | 47/57.7 |

OTHER PUBLICATIONS

International Search Report, in English, dated Jan. 12, 2018, which was issued by the International Bureau of WIPO in Applicant's corresponding international PCT application having Serial No. PCT/US2017/051301, filed on Sep. 13, 2017.

Written Opinion of the International Searching Authority, in English, dated Jan. 12, 2018, which was issued by the International Bureau of WIPO in Applicant's corresponding international PCT application having Serial No. PCT/US2017/051301, filed on Sep. 13, 2017.

METHOD AND APPARATUS TO INFUSE WATER WITH NITRATE ($NO_3$) AND NITRITE ($NO_2$) USING ELECTRICAL PLASMA FOR USE IN PLANT FERTILIZATION

CROSS-REFERENCE TO RELATED APPLICATIONS

This application is related to U.S. Provisional Patent Application Ser. No. 62/394,377, filed on Sep. 14, 2016, and entitled "Method and Apparatus to Infuse Water with Nitrate (NO2) and Nitrite (NO3) Using Electrical Plasma For Use in Plant Fertilization", the disclosure of which is hereby incorporated by reference and on which priority is hereby claimed.

BACKGROUND OF THE INVENTION

Field of Invention

This invention relates generally to devices that use plasma to fixate $N_2$ or break apart the nitrogen molecule in the atmosphere which the resulting N atom recombines with $O_2$ and $O_3$ and exposing the resulting $NO_2$ and $NO_3$ molecules to water for purposes of creating plant fertilization water.

Description of the Prior Art

It has been well known since the 1900's that during storms plasma in the form of lightning will fixate $N_2$ molecules in the atmosphere. When the $N_2$ molecule breaks apart it quickly bonds to $O_2$ and $O_3$ creating $NO_2$ and $NO_3$ (referred to NOx), which are called nitrites and nitrates. When water begins to form in the rain clouds they are exposed to the NOx gas which is absorbed into the water. When the nitrogenated water hits the ground plants absorb the "plasma generated" NOx more rapidly then when NOx is fixated by chemical reaction. This causes the plants to grow more rapidly.

It is also known that NOx can be produced when high voltage electric arcs are discharged.

The problems with these devices have been the plasma electrodes burn out rapidly due to the plasma striking the same place on the electrodes. Therefore, it would be advantageous to use large surface area concentric ringed electrodes and injecting air above and below the electrodes which will move the plasma electric arc so it strikes different places of the electrodes. The large surface area of the concentric ring shaped electrodes and the moving the plasma and the air cooling effect will thereby significantly extend plasma electrode life.

In previous devices, when the NOx gas is generated and exposed to water, the excess NOx gases are vented to the atmosphere. Therefore, it would be advantageous to capture and recirculate the NOx gas back to be exposed to water. This increases the concentration of NOx gas and therefore increases the absorption of the NOx into the water.

In previous devices, the method of gas to water exposure was through bubbling the generated NOx gas through a container of water. This method has found to be inefficient. Therefore, it would be advantageous to create a chamber that increases the surface area of the water to be exposed to the NOx by use of pressure controlled spray nozzles into the chamber and additionally use water redirection rings to slow the flow of water and increase the surface area of the water as it travels through the chamber.

As stated above, in previous devices, the plasma electrodes burn out in a short amount of time due to excessive heating of the electrodes from the plasma strikes. Therefore, in addition to the large surface area of the electrodes and the moving of the plasma it would be advantageous that the improved device place the plasma electrodes directly in the path of the water to create a water cooling effect of the electrodes.

In previous devices, there was no apparatus to temporarily collect, contain and pump the generated NOx water. Therefore, it would be advantageous to add a container, float switch, and pump to temporarily collect the NOx water, and when the container fills the float switch energizes a water pump which moves the NOx water into a larger external containment vessel located remotely. Additionally, it would be advantageous to place a float switch on the external storage tank and allow the unit to go to standby when the external storage tank is full.

In previous devices, there was no way to monitor the status of the system. Therefore, it would be advantageous to add a device that monitors the status and activity of the NOx generator and report the status and activity through the internet via Ethernet, Wi-Fi or cellular network to a remote web based server and database that can be used to notify users of the status or breakdown of the system.

OBJECTS AND SUMMARY OF THE INVENTION

It is an object of the present invention to provide two concentric stainless steel rings called the plasma electrodes that when energized with high voltage plasma forms in the air gap between the two rings.

It is another object of the present invention to provide a corona suppression material on the outside of the outer ring and the inside of the inner ring to minimize energy losses and to direct all energy to the air gap between the rings.

It is yet another object of the present invention to support the outer cathode plasma ring with plastic support and a glass tube insulator and the inner anode ring with plastic support and a glass tube insulator to prevent the high voltage from arcing through the supports and prevent shorting in the wet environment.

It is a further object of the present invention to provide four air injection ports, two opposing air ports above the plasma and two opposing ports below the plasma, and inject pressurized air into the ports created by a blower powered by a brushless motor which will move the plasma arcs so they will not strike the same point which will burn out the electrodes. Additionally, the injected air will provide a cooling effect of the electrodes so the they do not overheat and burn out.

It is still another object of the present invention to provide an exhaust air tube at the top of the plasma chamber that captures the unused NOx gas and directs the gas into the vacuum port of the blower which feeds the air injection ports thereby recycling any unabsorbed NOx gas back to the plasma chamber which will increase efficiency of generating the water containing NOx.

It is another object of the present invention to provide a gas trap at the bottom of the chamber which prevents any generated NOx gas from escaping into the atmosphere thus allowing the maximum uptake of NOx gas into the water.

It is yet another object of the present invention to provide a NOx-Water mixing tube affixed to the top of the plasma chamber tube that contains a water spray nozzle which has the combined benefit of cooling the plasma electrodes while allowing the water to be exposed to the NOx gas.

It is a further object of the present of the invention to provide a pressure regulator, and pressure gauge and nozzle that will allow the precise control of the water for the purpose of controlling the volume of water flow output and therefore the NOx concentration in the water.

It is still another object of the present invention to provide a NOx-Water mixing tube located above the plasma chamber which will contain a spray nozzle at the top of the tube which will inject a controlled flow of water against the tube wall which will increase the surface area of the water which will allow the NOx gas to be absorbed into the water.

It is yet another object of the present invention to provide a series of water deflection rings inside the NOx-Water mixing tube, so when the water surface tension creates a stream of water down the wall of the tube the water deflection rings will deflect the water around the top of the ring which will hold water inside the chamber for a longer period allowing more NOx gas to be absorbed into the water raising the concentration levels making the system more efficient.

It is yet a further object of the present invention to provide a water solenoid valve to start and stop the water flow based on the state of the external storage tank and safety sensors in the system.

It is a further object of the present invention to provide a speed control for the brushless blower motor and provide an electronic pressure sensor as the control input that will adjust the speed of the blower so that the negative pressure created by the blower inside the sealed chamber is low enough to allow the NOx water to flow out the bottom of the Plasma-NOx water mixing tube chamber.

It is another object of the present of the invention to provide a small tank, water pump and float switch internal to the device that temporarily collects the NOx water after it exits from the water trap. When the tank fills to a level a provided float switch energizes a small pump that pumps the NOx fluid to a large external NOx storage tank.

It is still another object of the present invention to provide is a second over limit float switch to detect if the pump fails or the output hose is clogged and with the over limit switch energized it will shut down the water supply and high voltage.

It is yet another object of the present invention to provide an external storage tank and tank full sensor that will stop the plasma, blower and water flow until the external storage tank is drained and the tank full sensor opens.

It is a further object of the present invention to provide a high voltage power supply that can generates at least 15,000 volts at at least 300 watts and at frequencies that range from about 60 hz to about 200 Khz and may be modulated that provides the Nitrogen fixation.

It is an object of the present invention to provide a control circuit that will monitor external tank status, internal tank status, input water pressure and air movement and when all sensors are satisfied energize the High voltage and water injection solenoid.

It is a further object of the present invention to provide a water pressure switch that is placed on the incoming water line and will open when no water is present so the plasma will not engage until there is water present.

It is yet a further object of the present invention to provide a pressure sensor on the blower output to prevent the plasma from energizing if the blower fails to start to prevent the plasma electrodes from burning out.

It is still another object of the present invention to provide a system that monitors the Nox Generator operation and reports the gallons of water generated and if there is a failure in the system to a web based server and report to the users via email, text message or mobile application or web page.

In accordance with one form of the present invention, a nitrogen-enriched water generator includes an elongated housing defining a sealed nitrogen/oxygen chamber in which nitrogen molecules are combined with oxygen molecules to form a nitrate ($NO_3$) or a nitrite ($NO_2$) gas (NOx gas). The housing includes an NOx gas and water mixing tube, a plasma generator and a nitrogen-enriched water trap.

The NOx gas and water mixing tube defines a first section of the sealed nitrogen/oxygen chamber and receives and exposes in the first section the NOx gas with water to form nitrogen-enriched water therein.

The plasma generator defines a second section of the sealed nitrogen/oxygen chamber which is in fluid communication with the first section. The plasma generator includes a first cylindrical outer electrode and a second cylindrical inner electrode situated radially within the first cylindrical outer electrode and spaced apart therefrom such that the first cylindrical outer electrode and the second cylindrical inner electrode define an air gap therebetween. The first cylindrical outer electrode and the second cylindrical inner electrode are concentrically arranged and in radial alignment with each other. The first cylindrical outer electrode and the second cylindrical inner electrode are electrically communicatable to a source of electrical charge and are oppositely electrically chargeable in polarity to generate a plasma in the gap therebetween. The plasma causes the NOx gas to be generated in the second section of the sealed nitrogen/oxygen chamber. The generated NOx gas flows into the first section of the sealed nitrogen/oxygen chamber and is exposed therein to the water to form the nitrogen-enriched water therein.

The nitrogen-enriched water trap defines a third section of the sealed nitrogen/oxygen chamber which is in fluid communication with at least the first section. The nitrogen-enriched water formed in the first section collects in the nitrogen-enriched water trap.

The nitrogen-enriched water generator, in accordance with a preferred form of the invention, further includes a water spray nozzle, at least one air injection connection, a vacuum connection and at least one nitrogen-enriched water connection. The water spray nozzle is affixed to the NOx gas and water mixing tube of the housing and is in fluid communication with the first section of the sealed nitrogen/oxygen chamber. The water spray nozzle is communicatable with a source of water to spray the water into the first section of the sealed nitrogen/oxygen chamber.

The at least one air injection connection is situated on the housing. The at least one air injection connection defines at least one air injection port in fluid communication with the second section of the sealed nitrogen/oxygen chamber. The at least one air injection connection is coupleable to a source of positive pressure air to inject air into the second section and into the gap between the first cylindrical outer electrode and the second cylindrical inner electrode of the plasma generator so as to expose the air to plasma generated by the plasma generator within the gap and thereby generate the NOx gas.

The vacuum connection is situated on the housing. The vacuum connection defines a vacuum port in fluid communication with at least one of the first, second and third sections of the sealed nitrogen/oxygen chamber. The vacuum connection is coupleable to a source of negative pressure air to remove a volume of NOx gas not absorbed by the water from the sealed nitrogen/oxygen chamber.

The at least one nitrogen-enriched water connection defines at least one nitrogen-enriched water outlet port in fluid communication with the third section of the sealed nitrogen/oxygen chamber. The nitrogen-enriched water connection is provided to remove the nitrogen-enriched water collected in the nitrogen-enriched water trap.

A method for generating nitrogen-enriched water, in accordance with the present invention, is also disclosed herein. The nitrogen-enriched water is generated in a sealed nitrogen/oxygen chamber defined by an elongated housing in which nitrogen molecules are combined with oxygen molecules to form a nitrate ($NO_3$) or a nitrite ($NO_2$) gas (NOx gas). The method preferably includes the step of generating a plasma using a plasma generator, the plasma generator defining a second section of the sealed nitrogen/oxygen chamber, the plasma generator including a first cylindrical outer electrode and a second cylindrical inner electrode situated radially within the first cylindrical outer electrode and spaced apart therefrom such that the first cylindrical outer electrode and the second cylindrical inner electrode define an air gap therebetween, the first cylindrical outer electrode and the second cylindrical inner electrode being concentrically arranged and in radial alignment with each other, the first cylindrical outer electrode and the second cylindrical inner electrode being electrically communicatable to a source of electrical charge and being oppositely electrically chargeable in polarity to generate a plasma in the gap therebetween.

The method further includes the step of injecting air into the second section of the sealed nitrogen/oxygen chamber and into the gap between the first cylindrical outer electrode and the second cylindrical inner electrode so as to expose the air to the plasma generated by the plasma generator within the gap, the plasma causing the NOx gas to be generated in the second section of the sealed nitrogen/oxygen chamber.

Furthermore, the method of the present invention further includes the step of receiving water in a first section of the sealed nitrogen/oxygen chamber and exposing the water to the NOx gas generated in the second section of the sealed nitrogen/oxygen chamber by the plasma generator to form nitrogen-enriched water therein, the second section in which the NOx gas is generated being in fluid communication with the first section.

The method also includes the step of collecting in a third section of the sealed nitrogen/oxygen chamber the nitrogen-enriched water formed in the first section, the third section being in fluid communication with at least the first section such that nitrogen-enriched water generated in the first section is collected in the third section of the sealed nitrogen/oxygen chamber.

These and other objects, features and advantages of the present invention will be apparent from the following detailed description of illustrative embodiments thereof, which is to be read in connection with the accompanying drawings.

DETAILED DESCRIPTION OF THE PREFERRED EMBODIMENTS

Figure 1:
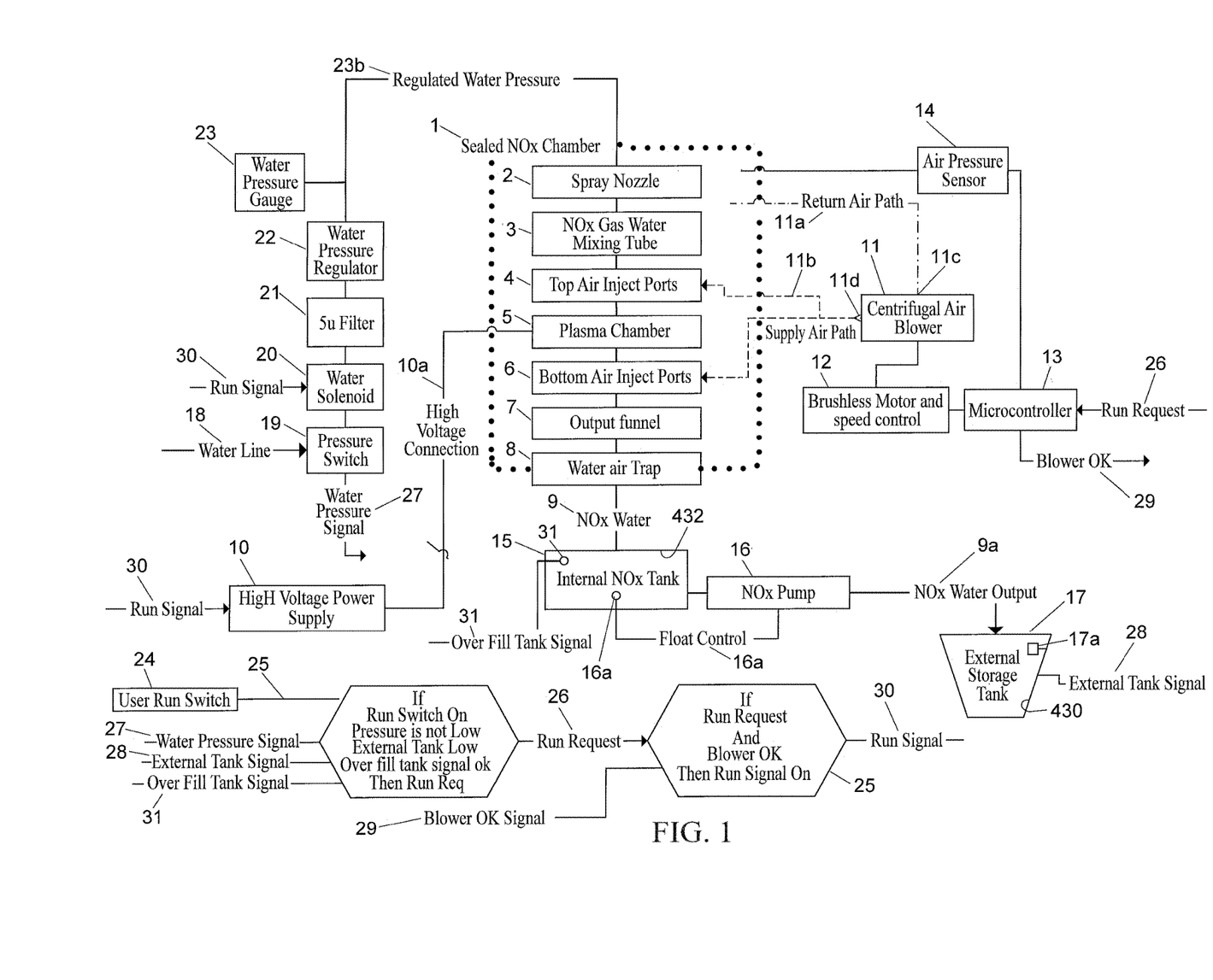
FIG. 1 Is The NOx Generator Functional Block Diagram.

Detailed Description of FIG. 1—Functional Block Diagram

The heart of the new and improved apparatus is the sealed NOx chamber 1. This assembly has two main purposes. Purpose one, using the plasma chamber 5, break apart the nitrogen $N_2$ molecules (a process called fixation) which are present in the atmosphere. The N atoms will instantly combine with the $O_2$ and $O_3$ molecules that are present in the atmosphere which forms $NO_2$ and $NO_3$. Purpose two, inject water into the sealed NOx chamber 1 by spray nozzle 2 and expose the generated NOx gas to the water in the NOx-Water mixing tube 3 so the water will absorb the NOx gas. The output funnel 7 and water air trap 8 creates an air seal that will allow the NOx water 9 to drain out while keeping the unabsorbed NOx gas inside the sealed NOx chamber 1.

When High voltage is applied to the plasma chamber 5 by high voltage power supply 10 using the high voltage connection 10a, an electrical arc forms which is generally called plasma. If the plasma arc is allowed to strike in the same place on the electrode continuously very high temperatures will cause the metal to melt and burn away. To minimize this effect air is injected by two opposing air ports above the plasma chamber 5 using the top air injecting ports 4 and two opposing air ports below the plasma chamber 5 using the bottom air injection ports 6.

When pressurized air is formed by centrifugal air blower 11 driven by the brushless motor 12 the air flows out blower outlet 11d and is directed by air path 11b to top air injector ports 4 and bottom air injector ports 6. This causes the plasma that is generated in the plasma chamber 5 to be moved in a circular pattern so that the arcs will continually strike different points on the plasma electrodes in the plasma chamber 5. The air will also create a cooling effect, thereby the combination of the moving plasma and the air cooling effect allows the electrodes to have a longer service life.

During the process some NOx gas is not absorbed by the water; therefore, the excess NOx gas in the sealed chamber 1 is sucked to the top of the chamber and is directed by the return gas path 11a back into the vacuum port 11c of centrifugal air blower 11. This allows the NOx gas created but not absorbed to be recycled into the sealed NOx chamber 1.

When the centrifugal blower 11 is driven too fast by the brushless motor, negative pressure is created inside the sealed NOx chamber 1. This causes the NOx water 9 to be trapped inside the sealed NOx chamber 1. To insure that the air is blown at the fastest speed but still allow the NOx water 9 to drain out the water air trap 8, a pressure sensor 14 and pressure control circuit, preferably forming part of a microcontroller circuit 13, are provided. The pressure control circuit/microcontroller 13 will continuously adjust the speed of the brushless motor 12 and keep the negative pressure at a level which will keep the water flowing out the water air trap 8 but run at the highest speed.

When the NOx water 9 exits the water air trap 8 it is collected by the internal NOx tank 15 until the float control switch 16a engages. This starts the NOx pump 16 which causes the NOx water output 9a to be pumped into an external storage tank 17. When the external storage tank 17 is full, a float switch 17a sends a full signal 28 to the run check circuit 25 (which may also form part of the microcontroller circuit 13) which de-energizes the run signal 26 which stops the NOx generator.

Fresh water supply enters the system at input water line 18 and is piped to the pressure switch 19 that closes when the water supply is pressurized. The water pressure signal 27 is connected to the run check circuit 25. This ensures that if the water supply is interrupted the system will shut down preventing overheating. The water is piped to the water solenoid 20 which is controlled by the run signal 30 generated by the run check circuit 25. The solenoid 20 is opened when the run signal 30 is present. The water is then piped to a 5 micron water filter 21 which filters out particulate matter so the hole in the spray nozzle 2 will not clog.

To create a constant water flow independent of incoming water pressure the incoming water is regulated with an adjustable water pressure regulator 22 and is shown on pressure gauge 23. The size of the orifice in the spray nozzle 2 and the constant pressure created by the water regulator 22 creates a constant flow of water which allows the user to adjust the concentration of the NOx and the water volume.

The user controls the system with the user run switch 24. When the user run switch 24 is set to the "ON" position, and the water pressure signal 27 is energized due to water pressure in the water line, and the external water tank signal 28 is energized due to the external tank 17 not full, and the over fill tank signal 31 is ok, a run request signal 26 is energized and sent to the microcontroller 13.

The microcontroller 13 starts the brushless motor 12 and monitors the air pressure sensor 14. When pressure is detected the microcontroller 13 energizes a blower ok signal 29. If the run request signal 26 and blower ok signal 29 are present the run signal 30 is energized.

Run signal 30 energizes the water solenoid 20 and the High voltage power supply 10. The system begins to spray water, create plasma and generate NOx water until one of the control signals is removed.

Figure 2:
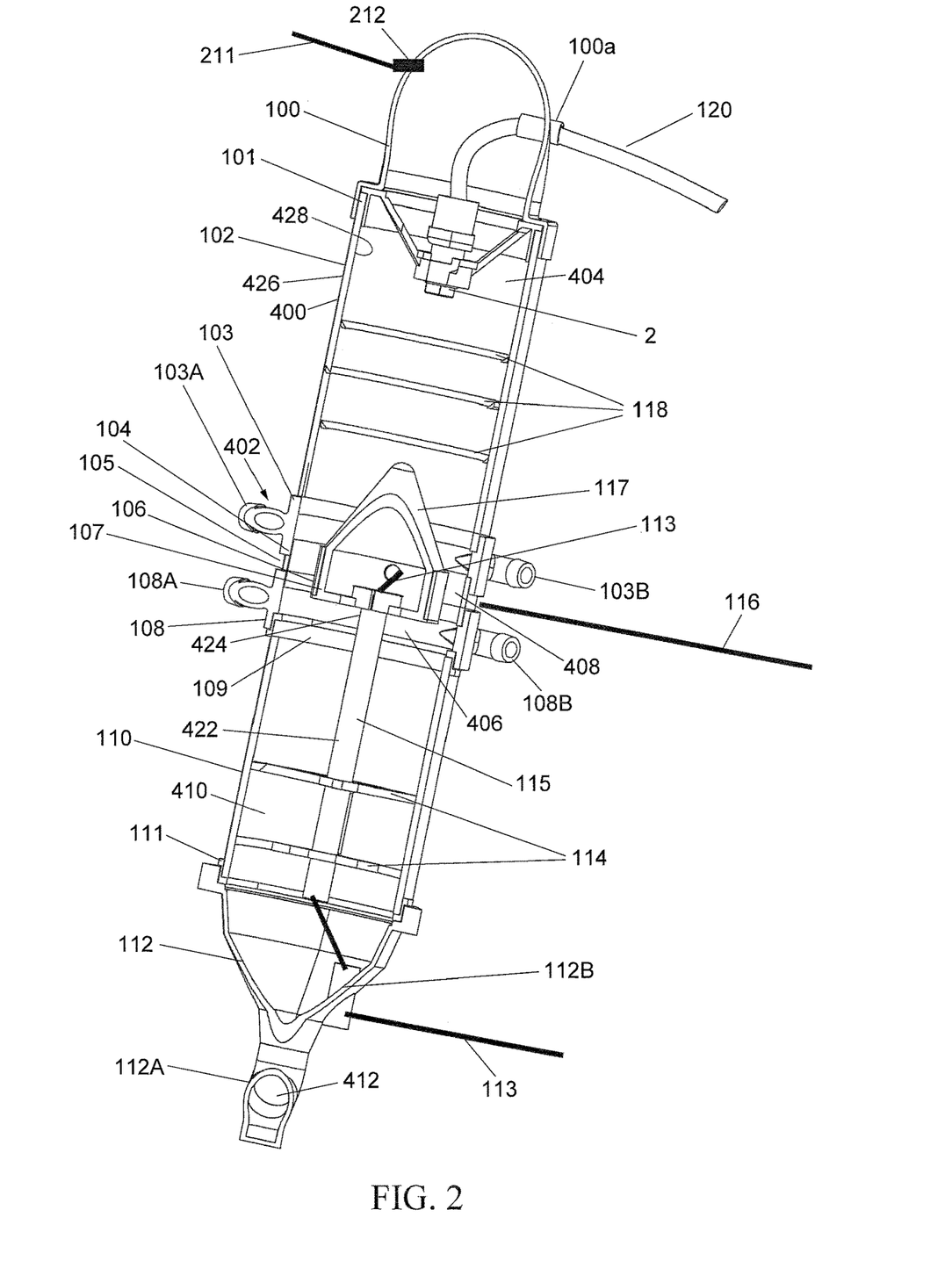
FIG. 2 Is The NOx Plasma Chamber Assembly.

Detailed Description of FIG. 2—Sealed NOx Chamber Assembly

There are three main sections of the sealed NOx chamber 1:
1—Water injection & NOx-Water mixing tube (101, 102)
2—Plasma chamber (103, 104, 106, 107, 108)
3—Water funnel and trap (112)

The water injection nozzle 2 and the NOx-Water mixing tube 102 are located at the top of the sealed NOx chamber assembly 1 (FIG. 2). The water tube 120 contains regulated pressurized water which is connected to nozzle 2, which is held in the center of the NOx-Water mixing tube 102 using the nozzle support bracket 101. When regulated pressurized water is supplied to nozzle 2, a fine mist of water is emitted from the nozzle. The mist hits the sides of the NOx-Water mixing tube 102 and as the mist of water is sprayed and the water runs down the sides of the NOx-Water mixing tube 102, the NOx gas present is absorbed into the water.

Due to surface tension of water, it forms into streams and runs down the NOx-Water mixing tube 102 quickly. Multiple axially spaced apart water deflection rings 118 are placed there and jut radially inwardly of the mixing tube 102 from the inner sides thereof to deflect the stream paths and slow the water down by temporarily collecting the water around the top of the rings 118. This allows more absorption of the NOx gas into the water.

The plasma chamber 103 consists of electrodes (preferably, two) supported by glass and plastic insulating material, as will be described in greater detail. The two electrodes are made from a stainless steel and are shaped and situated as concentric rings. The inner ring is preferably the anode 104. A larger diameter stainless steel outer ring is preferably the cathode 106, spaced from the anode 104. To insure all the high voltage energy is directed to the gap between the anode 104 and cathode 106, the radially outside surface of the cathode ring 106 and the radially inside surface of the anode ring 104 are coated with corona suppression material 107, 105, respectively, such as polyimide tape or corona spray.

To generate plasma, high voltage is applied to each ring 104, 106 by wires 113 and 116, respectively. The anode wire 113 is connected to the radially inside surface of the anode ring 104 and the cathode wire 116 is connected to the radially outside surface of the cathode ring 106 which can be seen in detail in FIG. 2A.

The cathode 106, with the corona suppression material 107, is assembled between the upper air injection ports 103 (there are preferably two, diametrically spaced apart upper ports 103A and 103B) and the lower air injection ports 108 (there are preferably two, diametrically spaced apart lower ports 108A and 108B). As will be explained in greater detail in relation to the air blower system shown in FIG. 3, the upper air ports 103A, 103B are coupled to and supported by a first air distribution ring 250 surrounding the mixing tube 102 or forming part thereof in proximity to the plasma chamber 103, the upper air ports being in communication with the air gap between the anode ring 104 and the cathode ring 106. The first distribution ring 250 is coupled to the air outlet port 11*d* of the blower 11 by tubing and Y connector reducers 205, 206, 208. Preferably, the upper air ports 103A, 103B are angularly offset by an angle of about 45 degrees from a radial axis of the mixing tube 102 to circulate air within the space between the anode ring 104 and the cathode ring 106 in either a clockwise direction or a counter-clockwise direction when the mixing tube 102 is viewed in radial transverse cross-section.

Similarly, the lower air ports 108A, 108B are coupled to and supported by a second air distribution ring 252 surrounding the mixing tube 102 or forming part thereof in proximity to the plasma chamber 103, the lower air ports being in communication with the air gap between the anode ring 104 and the cathode ring 106. The second distribution ring 252 is coupled to the air outlet port 11*d* of the blower 11 by tubing and Y connector reducers 205, 207, 208A. Preferably, the lower air ports 108A, 108B are angularly offset by an angle of about 45 degrees from a radial axis of the mixing tube 102 to circulate air within the space between the anode ring 104 and the cathode ring 106 in either a clockwise direction or a counter-clockwise direction when the mixing tube 102 is viewed in radial transverse cross-section.

Preferably, the upper section of the sealed chamber, i.e., the mixing tube upper portion 102, is made from plastic, or may be made from glass, whereas the lower section 109 is preferably made from glass, which has a higher dielectric and is less likely to carbonize when exposed to the high voltage plasma arcs.

RTV adhesive silicone is preferably used to hold the assembly 1 together to prevent water and air leakage. During assembly, a small area of the corona suppression material 107 is removed, and the bare cathode wire 116 is compressed between the lower air injection port 108 and the exposed stainless steel of cathode 106 to make electrical contact with the cathode 106 (see FIG. 2*a* for close up view).

When high voltage is applied between the anode 104 and the cathode 106, plasma will form as one continuous arc in the space between the anode 104 and the cathode 106. When pressurized air is injected into the four ports 103A, 103B, 108A, 108B, the air pushes the plasma around the gap between the anode 104 and the cathode 106 in a circular direction. This moving plasma prevents it from burning the stainless steel electrode rings 104, 106 and provides a cooling effect, extending the service life of the anode 104 and the cathode 106.

The cathode 106 and air injection port assemblies 250, 252 are connected to the lower glass tube 110 forming part of the assembly 1 with a gasket 109 to prevent water and NOx gas from leaking out. The lower glass tube 110 creates a high voltage insulation barrier to prevent the high voltage from arcing outside the plasma chamber 103.

The stainless steel ring anode 104 is insulated on its radially inside surface with polyimide tape 105, and a plastic, non-electrically conductive anode support cone 117, inverted with its apex pointing upwardly, is used to hold and center the anode 104 to the cathode 106. The anode support glass tube 115 is placed into the center of and supports the anode support cone 117. The anode supply wire 113 is placed into the bore of the anode support glass tube 115 and the wire is run up the glass tube 115 to the outside surface of the anode support cone 117 to an exposed area of the radially inside surface of the anode ring 104 through a hole 113A in the anode cone 117 to make electrical contact with the anode 104. This detail can be seen in FIG. 2A. The anode glass tube 115 is supported by two axially spaced apart, plastic centering parts 114 which holds the anode glass tube 115 in the center of the lower glass tube 110. This novel assembly insures there will be no electrical leakage outside the facing anode 104 and cathode 106.

The output cone-shaped NOx fluid trap 112 is assembled to the bottom of the lower glass tube 110 with a soft gasket 111 situated therebetween to prevent water and NOx gas from leaking out of the chamber 103. The anode supply wire 113 is routed out a tube port profile 112B that is integrated into the bottom of the output cone. The output cone-shaped trap 112 directs the NOx fluid out of the chamber 103 through port 112A in communication with the interior of the trap 112 and plasma chamber 103. The output cone-shaped trap 112 also contains a mounting bracket feature (not shown) which secures the assembly in an upright, vertical position in the device.

The top of the chamber 103 is capped with an air manifold elbow 100 which is used to complete the seal of the chamber 103. The air manifold elbow 100 is used to direct the excess NOx gas back to the input port 11d of the air blower system as detailed in FIG. 3. The air manifold elbow 100 tightly couples to the top of the upper NOx-Water mixing tube 102. A tube port 100A is provided on the side of the air manifold elbow 100 which allows the water supply tube 120 to enter the NOx-Water mixing tube 102 while still keeping it sealed.

Figure 2A:
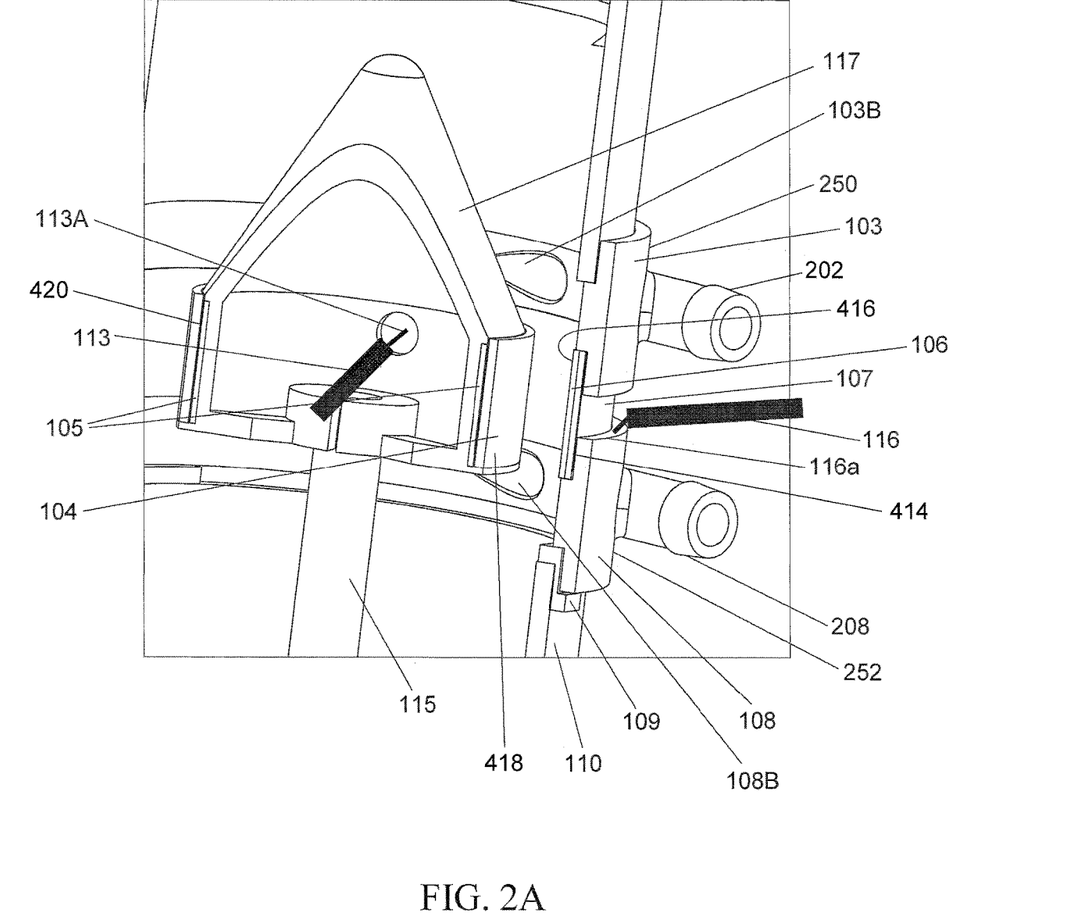
FIG. 2A Is The Plasma Electrode Assembly Detail.

Detailed Description of FIG. 2A—Plasma Electrode Assembly Detail

FIG. 2A shows a detail close up of the plasma electrode assembly. Anode 104 and Cathode 106 make up the two plasma electrodes. The air gap between them is where the plasma is created. A thin coating of corona suppression material 105 is shown applied to the radially inside surface of the stainless steel anode ring 104 and the radially outside surface of the plastic electrically insulative anode cone 117. Another thin coating of corona suppression material 107 is applied to the radially outside surface of the cathode 106 and to the radially inside surfaces of the top and bottom air port rings 250, 252.

The high voltage anode bare wire end 113A is captured between the anode support cone 117 and a bare section of the stainless steel anode 104 to make electrical contact therewith. The high voltage cathode bare wire end 116a is captured between an exposed portion of the cathode 106 and the bottom air port ring 252 to make electrical contact with the cathode 106.

One of the top air ports 103B and one of the bottom air ports 108B is shown in FIG. 2A. When air is injected into the four air ports 103A, 103B, 108A, 108B, the plasma is moved in a circular motion between the anode 104 and cathode 106.

The bottom glass tube 110 is shown in FIG. 2A with the soft gasket 109 pressed between tube 110 and the lower air port ring 252. The gasket 109 prevents water and gas from leaking from the chamber 103, and the bottom glass tube 110 prevents the high voltage from arcing and carbonizing.

The anode support glass tube 115 is shown in FIG. 2A with the anode support cone 117 mounted thereon. The anode supply wire 113 is shown going down the center bore of the glass anode support tube 115.

Figure 3:
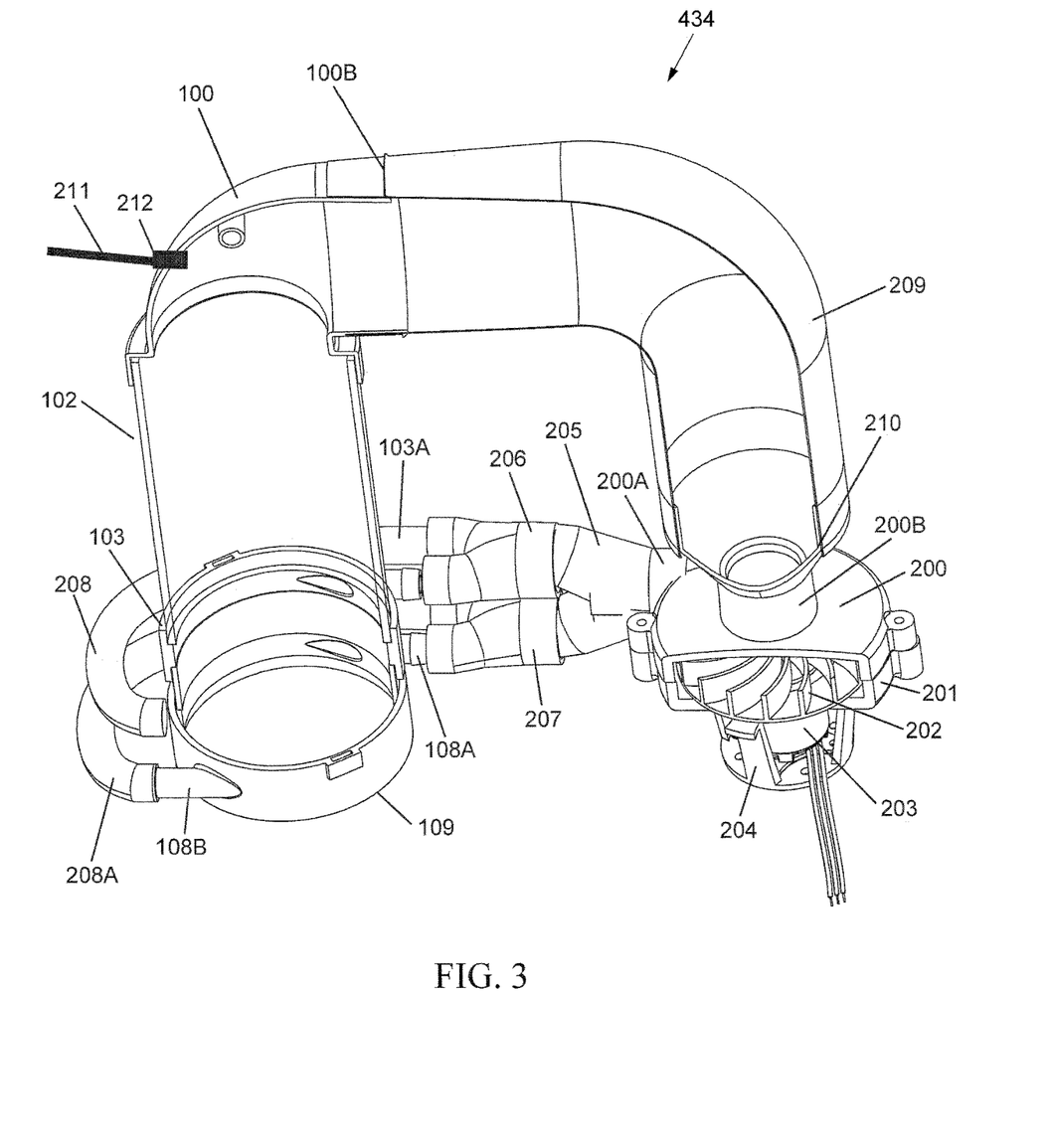
FIG. 3 Is The Pressurized Air System.

Detailed Description of FIG. 3—Air Blower System

The air system is provided to produce pressurized air for the purpose of moving the plasma around the electrodes 104, 106 which extends the service life and provides a cooling effect to the electrodes. A centrifugal blower assembly 11 is used to create the pressurized air. It includes an impeller 202 that uses a reverse blade design. The impeller 202 is rotated counter clockwise by the attached brushless motor 203 and the motor is held in place to the impeller housing by bracket 204. As the impeller 202 spins, it forces the air to the outside of the top blower housing 200 and bottom blower housing 201, together forming the overall impeller housing. The air is then forced out the output blower port 200A. As the air is moved out the blower output port 200A, a low pressure is created at the center of the impeller 202 and air rushes into the blower input port 200B.

A Y connector reducer 205 is attached to the output port 200A by a tight connection and silicone adhesive to create an air seal. Two smaller Y connector reducers 206 and 207 are connected to the two outlets of the first Y connector reducer 205 to provide four air output ports. Flexible tubing 208 and 208A are attached to the four air output ports of the Y connectors 206 and 207 and they are routed to the top air injection ports 103A and 103B (not shown) and the bottom injection air ports 108A and 108B (not shown). The four air injection ports 103A, 103B, 108A, 108B cause the plasma to rotate around the gap between the anode ring 104 and cathode ring 106.

As plasma breaks apart the $N_2$ molecules, they quickly bond with $O_2$ and $O_3$ creating the $NO_2$ and $NO_3$ (NOx) gas. The air flow creates a vortex of air inside the upper chamber tube 102. The moving vortex of air allows the NOx gas to be absorbed into the water as it flows down the sealed NOx chamber as shown in FIG. 2.

The air is sucked up the tube 102 to the chamber air manifold elbow 100. A small barb profile 100B is provided on the output of the air manifold elbow 100 which allows a 2¼ inch flexible hose 209 to be tightly attached to the output of the air manifold elbow 100. The 2¼ inch flexible hose 109 directs the air to a reducer 210 that is placed on the input port 200B of the top blower housing 200. This allows the air and NOx gas that is in the chamber 103 to be recycled past the water multiple times, which increases the absorption of the NOx gas into the water.

The chamber air seal is completed by creating a water trap 112A (see FIG. 2) at the bottom of the sealed NOx chamber assembly (see FIG. 2). The blower assembly 11 having components 200, 201, 202, 203 creates pressure, but because of the pressure drops, it also creates a vacuum in the sealed chamber relative to the outside of the sealed NOx chamber 103 (see FIG. 2). The faster the blower 11 moves, the higher the vacuum pressure becomes. There is a point when the vacuum becomes so high that outside air is drawn into the sealed NOx chamber (see FIG. 2) and will not allow the water to exit the bottom of the sealed NOx chamber 103 (see FIG. 2). The speed of the blower 11 is adjusted so that water is allowed to exit. The detail of this speed adjustment is described below in FIG. 4, Schematic NOx Generator.

Figure 4:
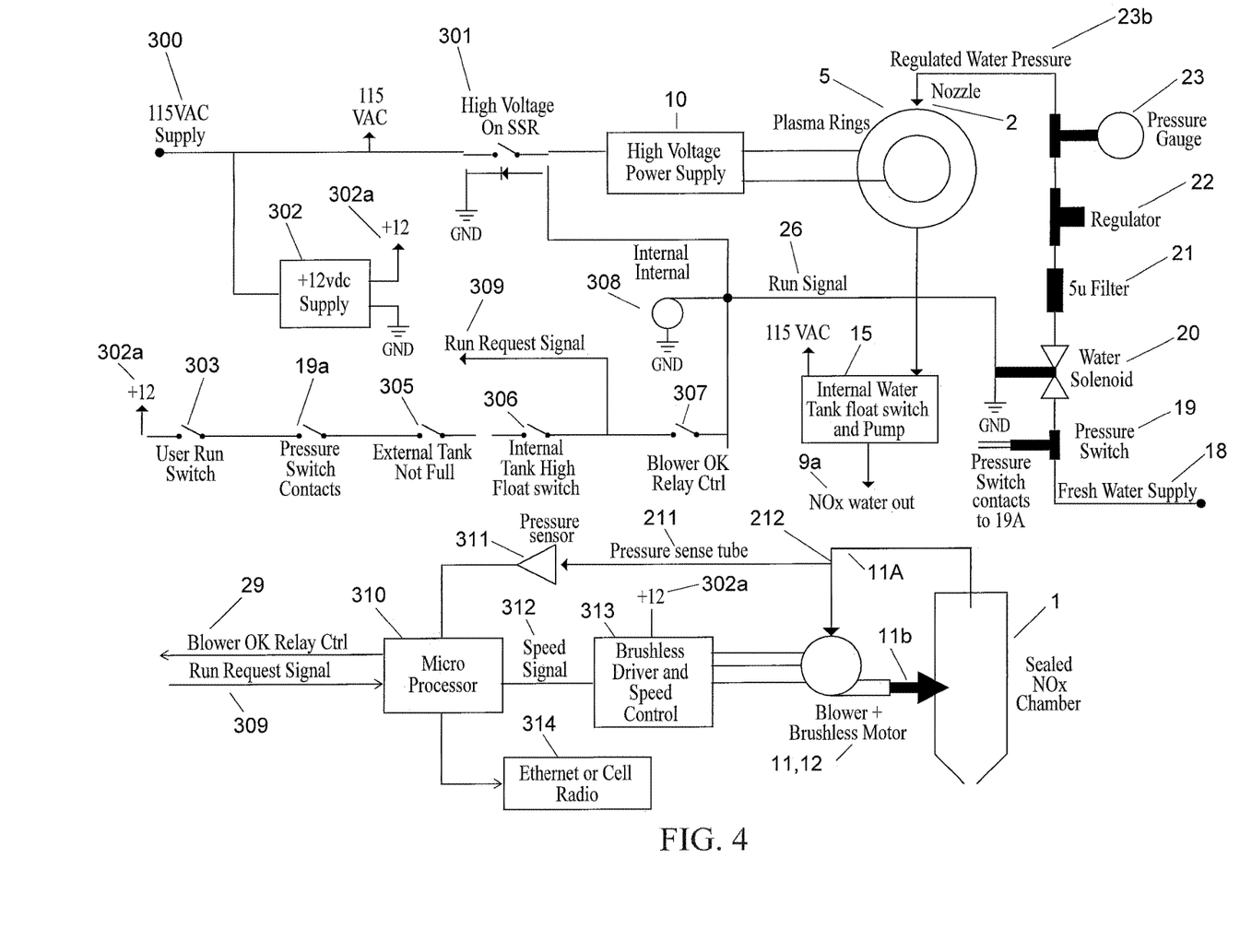
FIG. 4 Is The Schematic NOx Generator.

Detailed Description of FIG. 4—Schematic NOx Generator

115 VAC Power 300 is provided to the system via a connection on the back of the unit. The 115 VAC is distributed to a +12 volt power supply 302 and the float switch 16a for the internal water tank 15 and pump 16 and the solid state relay 301, which supplies power to the high voltage power supply 10.

The +12 volt power supply 302 is used to supply power to control the start/stop operation of the NOx generator and supplies the power to the microprocessor 310 (part 13 in FIG. 1) and the speed control 313 and the brushless motor air blower 11, 12 (in FIG. 3, parts 200-204).

The user controls the device by closing the user run switch 303. This supplies power to the pressure switch contacts 19A. When fresh water 18 is supplied, water pressure closes the pressure switch 19 and its contacts 19A.

Power is then supplied to the external tank "not full" float switch 305 (part 17a in FIG. 1). If the water in the external storage tank 17 is low, the external float switch 305 (17a) is engaged.

This supplies power to the internal tank high float switch 306 (part 16a in FIG. 1). This switch 306 (16a) will open if the internal water tank 15 becomes over full because the water in the tank 15 fails to empty due to a clog or a pump failure.

When the internal tank high float switch 306 (16a) is closed, power is supplied to the run request signal 309 and the "blower ok" relay 307 (see 29 in FIG. 1). The microprocessor 310 (part 13 in FIG. 1) detects the run request signal 309 (26 in FIG. 1) and sends a speed signal 312 to the brushless driver and speed control 313. The brushless driver and speed control 313 commutates the brushless motor 12 which causes the blower 11 to move the air in tubes 11B and 11A (see parts 100, 205, 206, 207, 208, 208A, 209 and 210 in FIG. 3). Negative pressure is formed in the sealed NOx chamber 1 which is detected by the pressure sensor 311 (part 14 in FIG. 1). The microprocessor 310 (part 13 in FIG. 1) along with a built in A/D (analog-to-digital) converter (which preferably forms part of the microprocessor 310) reads the analog pressure signal. When the pressure is detected by the microprocessor 310 (13), the blower ok relay control signal 29 energizes the blower ok relay 307. When the blower ok relay 307 closes, the run signal 26 is energized.

The energized run signal 26 supplies power to the High voltage Solid State Relay 301, which powers the High voltage power supply 10, which starts the plasma generation. The run signal 26 energizes the water solenoid 20, allowing water to flow to the 5 micron filter 21 and the pressure regulator 22, which regulates the water pressure that is shown on the pressure gauge 23. The regulated water pressure 23b is applied to the spray nozzle 2, which starts a controlled flow of water into the sealed NOx chamber assembly 1 (see FIG. 2). The Run indicator 308 is controlled by the microprocessor 310 (13) and lights when the run signal 26 is energized.

As stated above, the blower 11 should run as fast as possible. The faster the blower 11 moves, the higher the vacuum pressure becomes inside the sealed chamber 1. There is a point when the vacuum becomes so high, outside air is drawn into the chamber 1 and will not allow the NOx water to exit the bottom of the sealed NOx chamber 1. To insure the NOx water will be allowed to exit the chamber 1, the speed of the brushless motor 11, 12 is adjusted using a pressure sensor and microcontroller 310 (part 13 in FIG. 1). The control circuit monitors the pressure inside the sealed NOx chamber 1 using the pressure sensor port 212 communicatively coupled to the manifold 100 and tubing 211 connected at one end to port 212 and which is connected at the opposite end to the input port of a pressure sensor 311. The microcontroller 310 (13) converts the signal from the analog pressure sensor 311 to a digital number using an internal A/D (analog-to-digital) converter preferably forming part of the microcontroller 310. The microcontroller 310 (13) continually increases the speed of the brushless motor 11 until a negative pressure is achieved that still allows the water to exit the chamber 1 but maintains the maximum air flow. This set point pressure is preprogrammed into the microcontroller 310 (13).

The microprocessor 310 (13) is connected to the Ethernet or a cell radio 314. This allows the microprocessor 310 (13) to post the status of the NOx generator to a web site or a hand held smart device or cellular phone having an application loaded thereon for displaying the gallons made, status of the system and problems detected.

The present invention will now be further described. In accordance with a preferred form of the present invention, a nitrogen-enriched water generator includes an elongated housing 400 defining a sealed nitrogen/oxygen chamber 1 in which nitrogen molecules are combined with oxygen molecules to form a nitrate ($NO_3$) or a nitrite ($NO_2$) gas (NOx gas). The housing 400 includes an NOx gas and water mixing tube 102, a plasma generator 402 and a nitrogen-enriched water trap 112.

The NOx gas and water mixing tube 102 defines a first section 404 of the sealed nitrogen/oxygen chamber 1 and receives and exposes in the first section 404 the NOx gas with water to form nitrogen-enriched water therein.

The plasma generator 402 defines a second section 406 of the sealed nitrogen/oxygen chamber 1 which is in fluid communication with the first section 404. The plasma generator 402 includes a first cylindrical outer electrode 106 and a second cylindrical inner electrode 104 situated radially within the first cylindrical outer electrode 106 and spaced apart therefrom such that the first cylindrical outer electrode 106 and the second cylindrical inner electrode 104 define an air gap 408 therebetween. The first cylindrical outer electrode 106 and the second cylindrical inner electrode 104 are concentrically arranged and in radial alignment with each other. The first cylindrical outer electrode 106 and the second cylindrical inner electrode 104 are electrically communicatable to a source of electrical charge 10 and are oppositely electrically chargeable in polarity to generate a plasma in the gap 408 therebetween. The plasma causes the NOx gas to be generated in the second section 406 of the sealed nitrogen/oxygen chamber 1. The generated NOx gas flows into the first section 404 of the sealed nitrogen/oxygen chamber 1 and is exposed therein to the water to form the nitrogen-enriched water therein.

The nitrogen-enriched water trap 112 defines a third section 410 of the sealed nitrogen/oxygen chamber 1 which is in fluid communication with at least the first section 404. The nitrogen-enriched water formed in the first section 404 collects in the nitrogen-enriched water trap 112.

The nitrogen-enriched water generator, in accordance with the preferred form of the invention, further includes a water spray nozzle 2, at least one air injection connection 250, 252, a vacuum connection 100 and at least one nitrogen-enriched water connection 112A. The water spray nozzle 2 is affixed to the NOx gas and water mixing tube 102 of the housing 400 and is in fluid communication with the first section 404 of the sealed nitrogen/oxygen chamber 1. The water spray nozzle 2 is communicatable with a source of pressure-regulated water 22 to keep the flow of water constant and to spray the water into the first section 404 of the sealed nitrogen/oxygen chamber 1.

The at least one air injection connection 250, 252 is situated on the housing 400. The at least one air injection connection 250, 252 defines at least one air injection port 103, 108 in fluid communication with the second section 406 of the sealed nitrogen/oxygen chamber 1. The at least one air injection connection 250, 252 is coupleable to a source of positive pressure air 11 to inject air into the second section 406 and into the gap 408 between the first cylindrical outer electrode 106 and the second cylindrical inner electrode 104 of the plasma generator 402 so as to expose the air to plasma generated by the plasma generator 402 within the gap 408 and thereby generate the NOx gas.

The vacuum connection 100 is situated on the housing 400. The vacuum connection 100 defines a vacuum port 100a in fluid communication with at least one of the first, second and third sections 404, 406, 410 of the sealed nitrogen/oxygen chamber 1. The vacuum connection 100 is coupleable to a source of negative pressure air 11 to remove a volume of NOx gas not absorbed by the water from the sealed nitrogen/oxygen chamber 1.

The at least one nitrogen-enriched water connection 112A defines at least one nitrogen-enriched water outlet port 412 in fluid communication with the third section 410 of the sealed nitrogen/oxygen chamber 1. The nitrogen-enriched water connection 112A is provided to remove the nitrogen-enriched water collected in the nitrogen-enriched water trap 112.

The vacuum port 100a defined by the vacuum connection 100 is preferably in fluid communication with the at least one air injection port 103, 108 so that the volume of NOx gas not absorbed by the water in the sealed nitrogen/oxygen chamber 1 and removed therefrom through the vacuum port 100a is recycled and re-injected through the at least one air injection port 103, 108 into the sealed nitrogen/oxygen chamber 1.

Preferably, the first cylindrical outer electrode 106 includes an outer surface 414 and an inner surface 416 situated radially inwardly opposite the outer surface 414 thereof. Also, the second cylindrical inner electrode 104 includes an outer surface 418 and an inner surface 420 situated radially inwardly opposite the outer surface 418 thereof, the inner surface 416 of the first cylindrical outer electrode 106 facing the outer surface 418 of the second cylindrical inner electrode 104. Preferably, the outer surface 414 of the first cylindrical outer electrode 106 includes a corona suppression material 107 situated thereon, and the inner surface 420 of the second cylindrical inner electrode 104 includes a corona suppression material 105 situated thereon.

Even more preferably, the housing 400 defining the sealed nitrogen/oxygen chamber 1 is at least partially formed of a relatively high dielectric material so as to minimize carbonization of the housing 400 thereat. Specifically, the housing 400 defining the sealed nitrogen/oxygen chamber 1 may be at least partially formed from glass, the glass being situated in proximity to at least one of the second section 406 and the third section 410 of the sealed nitrogen/oxygen chamber 1. Or, the housing 400 defining the sealed nitrogen/oxygen chamber 1 is formed from one of plastic, glass and a combination of plastic and glass.

In accordance with another preferred form of the present invention, the nitrogen-enriched water generator further includes an electrically insulative support member 115. The electrically insulative support member 115 is situated within the sealed nitrogen/oxygen chamber 1, and the second cylindrical inner electrode 104 is mounted thereon and supported thereby.

Even more specifically, the electrically insulative support member 115 includes an elongated tube 422 having a central bore extending axially therethrough, the tube 422 having a first axial end 424. The second cylindrical inner electrode 104 is situated in proximity to the first axial end 424 of the elongated tube 422. The plasma generator 402 includes a first electrical conductor 113 and a second electrical conductor 116. The first electrical conductor 113 is disposed within the bore of the elongated tube 422 and is in electrical communication with the second cylindrical inner electrode 104. The second electrical conductor 116 is in electrical communication with the first cylindrical outer electrode 106.

Preferably, the electrically insulative support member 115 further includes an electrically insulative support cone 117. The support cone 117 is affixed to the elongated tube 422 at the first axial end 424 thereof, and the second cylindrical inner electrode 104 is mounted on and encircles the support cone 117.

In another preferred form of the nitrogen-enriched water generator of the present invention, the at least one air injection connection 250, 252 includes a first, upper air injection connection 250 situated on the housing 400 and a second, lower air injection connection 252 situated on the housing 400 and spaced axially from the first, upper air injection connection 250. The first, upper air injection connection 250 defines a first, upper air injection port 103A and a second, upper air injection port 103B spaced apart from the first, upper air injection port 103A, each of the first, upper air injection port 103A and the second, upper air injection port 103B being in fluid communication with the second section 406 of the sealed nitrogen/oxygen chamber 1. The first, upper air injection connection 250 is coupleable to the source of positive pressure air 11 to inject air through the first, upper air injection port 103A and the second, upper air injection port 103B into the second section 406 and into the gap 408 between the first cylindrical outer electrode 106 and the second cylindrical inner electrode 104. Similarly, the second, lower air injection connection 252 defines a first, lower air injection port 108A and a second, lower air injection port 108B spaced apart from the first, lower air injection port 108A, each of the first, lower air injection port 108A and the second, lower air injection port 108B being in fluid communication with the second section 406 of the sealed nitrogen/oxygen chamber 1. The second, lower air injection connection 252 is coupleable to the source of positive pressure air 11 to inject air through the first, lower air injection port 108A and the second, lower air injection port 108B into the second section 406 and into the gap 408 between the first cylindrical outer electrode 106 and the second cylindrical inner electrode 104.

In another preferred form of the invention, the first, upper air injection port 103A is situated diametrically opposite the second, upper air injection port 103B, and the first, lower air injection port 108A is situated diametrically opposite the second, lower air injection port 108B.

Preferably, the first cylindrical outer electrode 106 and the second cylindrical inner electrode 104 are positioned axially on the housing 400 between the first, upper air injection connection 250 and the second, lower air injection connection 252. Furthermore, the first, upper air injection connection 250 is preferably formed as a first cylindrical band encircling or defining a portion of the elongated, sealed nitrogen/oxygen chamber housing 400, and the second, lower air injection connection 252 is preferably formed as a second cylindrical band encircling or defining a portion of the elongated, sealed nitrogen/oxygen chamber housing 400.

In another preferred form of the invention, the first cylindrical outer electrode 106 and the second cylindrical inner electrode 104 have surfaces 416, 418 which face each other. Additionally, each of the first and second upper air injection ports 103A, 103B is preferably disposed at an angle offset from a radial axis of the housing 400 at the second section 406 of the sealed nitrogen/oxygen chamber 1 defined thereby so that the air injected into the gap 408 between the first cylindrical outer electrode 106 and the second cylindrical inner electrode 104 by the first and second upper air injection ports 103A, 103B is circulated therein in order to move arcs of plasma within the gap 408 so that the plasma arcs strike the facing surfaces 416, 418 of the first cylindrical outer electrode 106 and the second cylindrical inner electrode 104 at different locations thereon. In addition, each of the first and second lower air injection ports 108A, 108B may be preferably disposed at an angle offset from a radial axis of the housing 400 at the second section 406 of the sealed nitrogen/oxygen chamber 1 defined thereby so that the air injected into the gap 408 between the first cylindrical outer electrode 106 and the second cylindrical inner electrode 104 by the first and second lower air injection ports 108A, 108B is circulated therein in order to move arcs of plasma within the gap 408 so that the plasma arcs strike the facing surfaces 416, 418 of the first cylindrical outer electrode 106 and the second cylindrical inner electrode 104 at different locations thereon.

In another preferred form of the nitrogen-enriched water generator of the present invention, the NOx gas and water mixing tube 102 of the housing 400 includes a side wall 426 having a radially interior surface 428. The water spray nozzle 2 directs a spray of water onto the interior surface 428 of the side wall 426 of the NOx gas and water mixing tube 102. In this preferred embodiment, the NOx gas and water mixing tube 102 includes at least one water deflection ring 118 situated on and extending outwardly from the interior surface 428 of the side wall 426 of the NOx gas and water mixing tube 102 to impede the flow of water sprayed onto the interior surface 428 of the side wall 426 thereof within the first section 404 of the sealed nitrogen/oxygen chamber 1 axially along the interior surface 428 of the side wall 426.

A nitrogen-enriched water generator constructed in accordance with another preferred form of the present invention further includes a first nitrogen-enriched water storage tank 17. The first nitrogen-enriched water storage tank 17 defines an interior cavity 430, the interior cavity 430 being in fluid communication with the at least one nitrogen-enriched water outlet port 412 to receive and store nitrogen-enriched water therein. Furthermore, the first nitrogen-enriched water storage tank 17 includes a first water level sensor 17a in fluid communication with the interior cavity 430 thereof. The first water level sensor 17a detects the level of a volume of nitrogen-enriched water received by and stored within the interior cavity 430 of the first nitrogen-enriched water storage tank 17 and generates a first electrical signal in response thereto.

A preferred form of the nitrogen-enriched water generator includes an electronic circuit 13. The electronic circuit 13 is responsive to the first electrical signal generated by the first water level sensor 17a and generates a first control signal in response thereto. The generator further preferably includes a water solenoid valve 20. The water solenoid valve 20 is in fluid communication with the water spray nozzle 2. The water solenoid valve 20 is responsive to the first control signal generated by the electronic circuit 13 and controls the flow of pressure-regulated water through the water spray nozzle 2 in response thereto.

Additionally, a preferred form of the nitrogen-enriched water generator of the present invention includes a second, temporary, nitrogen-enriched water collection tank 15. The second, temporary, nitrogen-enriched water collection tank 15 defines an interior cavity 432, the interior cavity 432 of the second, temporary, nitrogen-enriched water collection tank 15 being in fluid communication with the at least one nitrogen-enriched water outlet port 412 and the interior cavity 430 of the first nitrogen-enriched water storage tank 17 to receive and at least temporarily collect nitrogen-enriched water therein. Also, the generator includes a second water level sensor 16a in fluid communication with the interior cavity 432 of the second, temporary, nitrogen-enriched water collection tank 15. The second water level sensor 16a detects the level of a volume of nitrogen-enriched water received by and at least temporarily collected within the interior cavity 432 of the second, temporary, nitrogen-enriched water collection tank 15 and generates a second electrical signal in response thereto. The electronic circuit 13 is responsive to the second electrical signal generated by the second water level sensor 16a and generates a second control signal in response thereto.

The preferred generator of the present invention further includes a nitrogen-enriched water pump 16. The nitrogen-enriched water pump 16 is in fluid communication with the interior cavity 432 of the second, temporary, nitrogen-enriched water collection tank 15 and the interior cavity 430 of the first nitrogen-enriched water storage tank 17. The nitrogen-enriched water pump 16 is responsive to the second control signal generated by the electronic circuit 13 and selectively pumps nitrogen-enriched water from the interior cavity 432 of the second, temporary, nitrogen-enriched water collection tank 15 to the interior cavity 430 of the first nitrogen-enriched water storage tank 17 in response thereto.

The nitrogen-enriched water generator of the present invention may further include an over limit water sensor 31, the over limit water sensor 31 being in fluid communication with the interior cavity 432 of the second, temporary, nitrogen-enriched water collection tank 15. The over limit water sensor 31 detects a high level of the volume of nitrogen-enriched water collected by the second, temporary, nitrogen-enriched water collection tank 15 and generates an electrical high level sensor signal in response thereto. The electronic circuit 13 is responsive to the high level sensor signal and generates the first control signal in response thereto. The water solenoid valve 20 controls the flow of water through the water spray nozzle 2 in response to the first control signal generated by the electronic circuit 13.

Furthermore, in a preferred form, the nitrogen-enriched water generator of the present invention further includes a water pressure sensor 23, the water pressure sensor 23 being in fluid communication with the water solenoid valve 20 and the water spray nozzle 2. The water pressure sensor 23 detects a low pressure of water provided to the water spray nozzle 2 and generates an electrical low water pressure signal in response thereto. The electronic circuit 13 is responsive to the low water pressure signal and controls the electrical communication between the source of electrical charge 10 and the first cylindrical outer electrode 106 and the second cylindrical inner electrode 104 in response thereto.

The nitrogen-enriched water generator of the present invention also includes an air blower system 434. The air blower system 434 constitutes the source of positive pressure air 11 coupled to the at least one air injection connection 250, 252 and constitutes the source of negative pressure air 11 coupled to the vacuum connection 100. The air blower system 434 includes an air pressure sensor 14 in fluid communication with the at least one air injection port 103, 108. The air pressure sensor 14 detects the pressure of air provided by the air blower system 434 to the at least one air injection port 103, 108 and generates an electrical air pressure signal in response thereto. The electronic circuit 13 is responsive to the air pressure signal generated by the air pressure sensor 14 and controls the electrical communication between the source of electrical charge 10 and the first cylindrical outer electrode 106 and the second cylindrical inner electrode 104 in response thereto.

In another form of the present invention, the at least one air injection connection 250, 252 of the generator defines a first injection port 103A, 108A and a second injection port 103B, 108B spaced apart from the first injection port 103A, 108A. Each of the first injection port 103A, 108A and the second injection port 103B, 108B is in fluid communication with the second section 406 of the sealed nitrogen/oxygen chamber 1. The at least one air injection connection 250, 252 is coupleable to the source of positive pressure air 11 to inject air through the first air injection port 103A, 108A and the second air injection port 103B, 108B into the second section 406 and into the gap 408 between the first cylindrical outer electrode 106 and the second cylindrical inner electrode 104. Preferably, the first air injection port 103A, 108A is situated diametrically opposite the second air injection port 103B, 108B. Furthermore, the at least one air injection connection 250, 252 is preferably formed as a cylindrical band encircling or defining a portion of the elongated, sealed nitrogen/oxygen chamber housing 400. Even more preferably, each of the first air injection port 103A, 108A and the second air injection port 103B, 108B is disposed at an angle offset from a radial axis of the housing 400 at the second section 406 of the sealed, nitrogen/oxygen chamber 1 defined thereby so that air injected into the gap 408 between the first cylindrical outer electrode 106 and the second cylindrical inner electrode 104 is circulated therein in order to move arcs of plasma within the gap 408 so that the plasma arcs strike the facing surfaces 416, 418 of the first cylindrical outer electrode 106 and the second cylindrical inner electrode 104 at different locations thereon.

In another form of the nitrogen-enriched water generator of the present invention, the at least one air injection connection 250, 252 includes an upper air injection connection 250 situated on the housing 400 and a lower air injection connection 252 situated on the housing 400 and spaced axially from the upper air injection connection 250, the upper air injection connection 250 defining an upper air injection port 103A, 103B. The upper air injection port 103A, 103B is in fluid communication with the second section 406 of the sealed nitrogen/oxygen chamber 1. The upper air injection connection 250 is coupleable to the source of positive pressure air 11 to inject air through the upper air injection port 103A, 103B into the second section 406 and into the gap 408 between the first cylindrical outer electrode 106 and the second cylindrical inner electrode 104.

Similarly, the lower air injection connection 252 defines a lower air injection port 108A, 108B, the lower air injection port 108A, 108B being in fluid communication with the second section 406 of the sealed nitrogen/oxygen chamber 1. The lower air injection connection 252 is coupleable to the source of positive pressure air 11 to inject air through the lower air injection port 108A, 108B into the second section 406 and into the gap 408 between the first cylindrical outer electrode 106 and the second cylindrical inner electrode 104. Preferably, the first cylindrical outer electrode 106 and the second cylindrical inner electrode 104 are positioned axially on the housing 400 between the upper air injection connection 250 and the lower air injection connection 252. Also, the upper air injection connection 250 is formed as a first cylindrical band encircling or defining a portion of the elongated, sealed nitrogen/oxygen chamber housing 400, and the lower air injection connection 252 is formed as a second cylindrical band encircling or defining a portion of the elongated, sealed nitrogen/oxygen chamber housing 400.

Preferably, each of the upper air injection port 103A, 103B and the lower air injection port 108A, 108B is disposed at an angle offset from a radial axis of the housing 400 at the second section 406 of the sealed, nitrogen/oxygen chamber 1 defined thereby so that air injected into the gap 408 between the first cylindrical outer electrode 106 and the second cylindrical inner electrode 104 is circulated therein in order to move arcs of plasma within the gap 408 so that the plasma arcs strike the facing surfaces 416, 418 of the first cylindrical outer electrode 106 and the second cylindrical inner electrode 104 at different locations thereon.

A method for generating nitrogen-enriched water, in accordance with the present invention, is also now further described. The nitrogen-enriched water is generated in a sealed nitrogen/oxygen chamber 1 defined by an elongated housing 400 in which nitrogen molecules are combined with oxygen molecules to form a nitrate ($NO_3$) or a nitrite ($NO_2$) gas (NOx gas). The method preferably includes the step of generating a plasma using a plasma generator 402, the plasma generator 402 defining a second section 406 of the sealed nitrogen/oxygen chamber 1, the plasma generator 402 including a first cylindrical outer electrode 106 and a second cylindrical inner electrode 104 situated radially within the first cylindrical outer electrode 106 and spaced apart therefrom such that the first cylindrical outer electrode 106 and the second cylindrical inner electrode 104 define an air gap 408 therebetween, the first cylindrical outer electrode 106 and the second cylindrical inner electrode 104 being concentrically arranged and in radial alignment with each other, the first cylindrical outer electrode 106 and the second cylindrical inner electrode 104 being electrically communicatable to a source of electrical charge 11 and being oppositely electrically chargeable in polarity to generate a plasma in the gap 408 therebetween.

The method further includes the step of injecting air into the second section 406 of the sealed nitrogen/oxygen chamber 1 and into the gap 408 between the first cylindrical outer electrode 106 and the second cylindrical inner electrode 104 so as to expose the air to the plasma generated by the plasma generator 402 within the gap 408, the plasma causing the NOx gas to be generated in the second section 406 of the sealed nitrogen/oxygen chamber 1.

Furthermore, the method of the present invention further includes the step of receiving water in a first section 404 of the sealed nitrogen/oxygen chamber 1 and exposing the water to the NOx gas generated in the second section 406 of the sealed nitrogen/oxygen chamber 1 by the plasma generator 402 to form nitrogen-enriched water therein, the second section 406 in which the NOx gas is generated being in fluid communication with the first section 404.

The method also includes the step of collecting in a third section 410 of the sealed nitrogen/oxygen chamber 1 the nitrogen-enriched water formed in the first section 404, the third section 410 being in fluid communication with at least the first section 404 such that nitrogen-enriched water generated in the first section 404 is collected in the third section 410 of the sealed nitrogen/oxygen chamber 1.

In a preferred form of the method for generating nitrogen-enriched water, the step of receiving water into the first section 404 of the sealed nitrogen/oxygen chamber 1 includes the step of spraying water into at least the first section 404 of the sealed nitrogen/oxygen chamber 1.

Additionally, in a preferred method of the present invention, the step of injecting air into the second section 406 of the sealed nitrogen/oxygen chamber 1 includes the step of injecting air at an angle offset from a radial axis of the housing 400 at the second section 406 of the sealed nitrogen/oxygen chamber 1 so that the air injected into the gap 408 between the first cylindrical outer electrode 106 and the second cylindrical inner electrode 104 is circulated therein in order to move arcs of plasma within the gap 408 so that the plasma arcs strike the facing surfaces 416, 418 of the first cylindrical outer electrode 106 and the second cylindrical inner electrode 104 at different locations thereon.

A method for generating nitrogen-enriched water in accordance with another form of the present invention further includes the steps of removing a volume of NOx gas not absorbed by the water from the sealed nitrogen/oxygen chamber 1, and reintroducing the volume of NOx gas not absorbed by the water and removed from the sealed nitrogen/oxygen chamber 1 into the second section 406 of the sealed nitrogen/oxygen chamber 1 and into the gap 408 between the first cylindrical outer electrode 106 and the second cylindrical inner electrode 104.

The housing 400 defining the sealed nitrogen/oxygen chamber 1 preferably includes a side wall 426 having a radially interior surface 428. In accordance with the method of the present invention in a preferred form, the step of receiving water in the first section 404 of the sealed nitrogen/oxygen chamber 1 includes the step of directing a spray of water onto the interior surface 428 of the side wall 426 of the housing 400 at least over an axial portion thereof situated at the first section 404 of the sealed nitrogen/oxygen chamber 1. In addition, the method preferably includes the step of impeding the flow of water sprayed onto the interior surface 428 of the side wall 426 of the housing 400 within the first section 404 of the sealed nitrogen/oxygen chamber 1 axially along the interior surface 428 of the side wall 426 so as to increase the exposure of the water to the NOx gas.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A nitrogen-enriched water generator, which comprises:
   an elongated housing defining a sealed nitrogen/oxygen chamber in which nitrogen molecules are combined with oxygen molecules to form an NOx gas, namely a nitrate (NO3) and/or a nitrite (NO2) gas, the housing including:
   an NOx gas and water mixing tube, the NOx gas and water mixing tube defining a first section of the sealed nitrogen/oxygen chamber and receiving and exposing in the first section the NOx gas with water from a water spray nozzle to form nitrogen-enriched water therein;
   a plasma generator, the plasma generator defining a second section of the sealed nitrogen/oxygen chamber which is in fluid communication with the first section, the plasma generator including a first cylindrical outer electrode and a second cylindrical inner electrode situated radially within the first cylindrical outer electrode and spaced apart therefrom such that the first cylindrical outer electrode and the second cylindrical inner electrode define an air gap therebetween, the first cylindrical outer electrode and the second cylindrical inner electrode being concentrically arranged and in radial alignment with each other, the first cylindrical outer electrode and the second cylindrical inner electrode being electrically communicatable to a source of electrical charge and being oppositely electrically chargeable in polarity to generate a plasma in the gap therebetween, the plasma causing the NOx gas to be formed in the second section of the sealed nitrogen/oxygen chamber, the formed NOx gas flowing into the first section of the sealed nitrogen/oxygen chamber and being exposed therein to the water to form the nitrogen-enriched water therein; and
   a nitrogen-enriched water trap, the nitrogen-enriched water trap defining a third section of the sealed nitrogen/oxygen chamber which is in fluid communication with at least the first section, the nitrogen-enriched water formed in the first section collecting in the nitrogen-enriched water trap;
   and wherein the nitrogen-enriched water generator further comprises:
   the water spray nozzle, the water spray nozzle being affixed to the NOx gas and water mixing tube of the housing and being in fluid communication with the first section of the sealed nitrogen/oxygen chamber, the water spray nozzle being communicatable with a source of water to spray the water into the first section of the sealed nitrogen/oxygen chamber;
   at least one air injection connection situated on the housing, the at least one air injection connection defining at least one air injection port in fluid communication with the second section of the sealed nitrogen/oxygen chamber, the at least one air injection connection being coupleable to a source of positive pressure air to inject air into the second section and into the gap between the first cylindrical outer electrode and the second cylindrical inner electrode of the plasma generator so as to expose the air to the plasma generated by the plasma generator within the gap and thereby form the NOx gas;
   a vacuum connection situated on the housing, the vacuum connection defining a vacuum port in fluid communication with at least one of the first, second and third sections of the sealed nitrogen/oxygen chamber, the vacuum connection being coupleable to a source of negative pressure air to remove a volume of the formed NOx gas not absorbed by the water from the sealed nitrogen/oxygen chamber; and
   at least one nitrogen-enriched water connection, the at least one nitrogen-enriched water connection defining at least one nitrogen-enriched water outlet port in fluid communication with the third section of the sealed nitrogen/oxygen chamber, the nitrogen-enriched water connection being provided to remove the nitrogen-enriched water collected in the nitrogen-enriched water trap.

2. A nitrogen-enriched water generator as defined by claim 1, wherein the vacuum port defined by the vacuum connection is in fluid communication with the at least one air injection port so that the volume of the formed NOx gas not absorbed by the water in the sealed nitrogen/oxygen chamber and removed therefrom through the vacuum port is recycled and re-injected through the at least one air injection port into the sealed nitrogen/oxygen chamber.

3. A nitrogen-enriched water generator as defined by claim 1, wherein the first cylindrical outer electrode includes an outer surface and an inner surface situated radially inwardly opposite the outer surface thereof;

wherein the second cylindrical inner electrode includes an outer surface and an inner surface situated radially inwardly opposite the outer surface thereof, the inner surface of the first cylindrical outer electrode facing the outer surface of the second cylindrical inner electrode;

wherein the outer surface of the first cylindrical outer electrode includes a corona suppression material situated thereon; and wherein the inner surface of the second cylindrical inner electrode includes a corona suppression material situated thereon.

4. A nitrogen-enriched water generator as defined by claim 1, wherein the housing defining the sealed nitrogen/oxygen chamber is at least partially formed of a relatively high dielectric material so as to minimize carbonization of the housing thereat.

5. A nitrogen-enriched water generator as defined by claim 1, wherein the housing defining the sealed nitrogen/oxygen chamber is at least partially formed from glass, the glass being situated in proximity to at least one of the second section and the third section of the sealed nitrogen/oxygen chamber.

6. A nitrogen-enriched water generator as defined by claim 1, wherein the housing defining the sealed nitrogen/oxygen chamber is formed from one of plastic, glass and a combination of plastic and glass.

7. A nitrogen-enriched water generator as defined by claim 1, which further comprises:

an electrically insulative support member, the electrically insulative support member being situated within the sealed nitrogen/oxygen chamber, the second cylindrical inner electrode being mounted thereon and supported thereby.

8. A nitrogen-enriched water generator as defined by claim 7, wherein the electrically insulative support member includes an elongated tube having a central bore extending axially therethrough, the tube having a first axial end;

wherein the second cylindrical inner electrode is situated in proximity to the first axial end of the elongated tube; and wherein the plasma generator includes a first electrical conductor and a second electrical conductor, the first electrical conductor being disposed within the bore of the elongated tube and being in electrical communication with the second cylindrical inner electrode, the second electrical conductor being in electrical communication with the first cylindrical outer electrode.

9. A nitrogen-enriched water generator as defined by claim 8, wherein the electrically insulative support member further includes an electrically insulative support cone, the support cone being affixed to the elongated tube at the first axial end thereof, the second cylindrical inner electrode being mounted on and encircling the support cone.

10. A nitrogen-enriched water generator as defined by claim 1, wherein the at least one air injection connection includes a first, upper air injection connection situated on the housing and a second, lower air injection connection situated on the housing and spaced axially from the first, upper air injection connection, the first, upper air injection connection defining a first, upper air injection port and a second, upper air injection port spaced apart from the first, upper air injection port, each of the first, upper air injection port and the second, upper air injection port being in fluid communication with the second section of the sealed nitrogen/oxygen chamber, the first, upper air injection connection being coupleable to the source of positive pressure air to inject the air through the first, upper air injection port and the second, upper air injection port into the second section and into the gap between the first cylindrical outer electrode and the second cylindrical inner electrode, the second, lower air injection connection defining a first, lower air injection port and a second, lower air injection port spaced apart from the first, lower air injection port, each of the first, lower air injection port, and the second, lower air injection port being in fluid communication with the second section of the sealed nitrogen/oxygen chamber, the second, lower air injection connection being coupleable to the source of positive pressure air to inject the air through the first, lower air injection port and the second, lower air injection port into the second section and into the gap between the first cylindrical outer electrode and the second cylindrical inner electrode.

11. A nitrogen-enriched water generator as defined by claim 10, wherein the first, upper air injection port is situated diametrically opposite the second, upper air injection port; and wherein the first, lower air injection port is situated diametrically opposite the second, lower air injection port.

12. A nitrogen-enriched water generator as defined by claim 10, wherein the first cylindrical outer electrode and the second cylindrical inner electrode are positioned axially in the housing between the first, upper air injection connection and the second, lower air injection connection.

13. A nitrogen-enriched water generator as defined by claim 10, wherein the first, upper air injection connection is formed as a first cylindrical band encircling or defining a portion of the elongated, sealed nitrogen/oxygen chamber housing; and wherein the second, lower air injection connection is formed as a second cylindrical band encircling or defining a portion of the elongated, sealed nitrogen/oxygen chamber housing.

14. A nitrogen-enriched water generator as defined by claim 10, wherein the first cylindrical outer electrode and the second cylindrical inner electrode have surfaces which face each other; and wherein each of the first and second upper air injection ports is disposed at an angle offset from a radial axis of the housing at the second section of the sealed nitrogen/oxygen chamber defined thereby so that the air injected into the gap between the first cylindrical outer electrode and the second cylindrical inner electrode is circulated therein in order to move arcs of the plasma within the gap so that the plasma arcs strike the facing surfaces of the first cylindrical outer electrode and the second cylindrical inner electrode at different locations thereon.

15. A nitrogen-enriched water generator as defined by claim 14, wherein each of the first and second lower air injection ports is disposed at an angle offset from a radial axis of the housing at the second section of the sealed nitrogen/oxygen chamber defined thereby so that the air injected into the gap between the first cylindrical outer electrode and the second cylindrical inner electrode by the first and second lower air injection ports is circulated therein in order to move arcs of the plasma within the gap so that the plasma arcs strike the facing surfaces of the first cylindrical outer electrode and the second cylindrical inner electrode at different locations thereon.

16. A nitrogen-enriched water generator as defined by claim 1, wherein the NOx gas and water mixing tube of the housing includes a side wall having a radially interior surface;
wherein the water spray nozzle directs a spray of water onto the interior surface of the side wall of the NOx gas and water mixing tube; and
wherein the NOx gas and water mixing tube includes at least one water deflection ring situated on and extending outwardly from the interior surface of the side wall of the NOx gas and water mixing tube to impede a flow of water sprayed onto the interior surface of the side wall thereof within the first section of the sealed nitrogen/oxygen chamber axially along the interior surface of the side wall.

17. A nitrogen-enriched water generator as defined by claim 1, which further comprises:
a first nitrogen-enriched water storage tank, the first nitrogen-enriched water storage tank defining an interior cavity, the interior cavity being in fluid communication with the at least one nitrogen-enriched water outlet port to receive and store the removed nitrogen-enriched water therein.

18. A nitrogen-enriched water generator as defined by claim 17, wherein the first nitrogen-enriched water storage tank includes a first water level sensor in fluid communication with the interior cavity thereof, the first water level sensor detecting a level of a volume of the nitrogen-enriched water received by and stored within the interior cavity of the first nitrogen-enriched water storage tank and generating a first electrical signal in response thereto.

19. A nitrogen-enriched water generator as defined by claim 18, which further comprises:
an electronic circuit, the electronic circuit being responsive to the first electrical signal generated by the first water level sensor and generating a first control signal in response thereto; and
a water solenoid valve, the water solenoid valve being in fluid communication with the water spray nozzle, the water solenoid valve being responsive to the first control signal generated by the electronic circuit and controlling to a flow of water through the water spray nozzle in response thereto.

20. A nitrogen-enriched water generator as defined by claim 19, which further comprises:
a second, temporary, nitrogen-enriched water collection tank, the second, temporary, nitrogen-enriched water collection tank defining an interior cavity, the interior cavity of the second, temporary, nitrogen-enriched water collection tank being in fluid communication with the at least one nitrogen-enriched water outlet port and the interior cavity of the first nitrogen-enriched water storage tank to receive and at least temporarily collect the removed nitrogen-enriched water therein;
a second water level sensor in fluid communication with the interior cavity of the second, temporary, nitrogen-enriched water collection tank, the second water level sensor detecting a level of a volume of the nitrogen-enriched water received by and at least temporarily collected within the interior cavity of the second, temporary, nitrogen-enriched water collection tank and generating a second electrical signal in response thereto, the electronic circuit being responsive to the second electrical signal generated by the second water level sensor and generating a second control signal in response thereto; and
a nitrogen-enriched water pump, the nitrogen-enriched water pump being in fluid communication with the interior cavity of the second, temporary, nitrogen-enriched water collection tank and the interior cavity of the first nitrogen-enriched water storage tank, the nitrogen-enriched water pump being responsive to the second control signal generated by the electronic circuit and selectively pumping the nitrogen-enriched water from the interior cavity of the second, temporary, nitrogen-enriched water collection tank to the interior cavity of the first nitrogen-enriched water storage tank in response thereto.

21. A nitrogen-enriched water generator as defined by claim 20, which further comprises:
an over limit water sensor, the over limit water sensor being in fluid communication with the interior cavity of the second, temporary, nitrogen-enriched water collection tank, the over limit water sensor detecting a high level of the volume of nitrogen-enriched water collected by the second, temporary, nitrogen-enriched water collection tank and generating an electrical high level sensor signal in response thereto, the electronic circuit being responsive to the high level sensor signal and generating the first control signal in response thereto, the water solenoid valve controlling a flow of water through the water spray nozzle in response to the first control signal generated by the electronic circuit.

22. A nitrogen-enriched water generator as defined by claim 19, which further comprises:
a water pressure sensor, the water pressure sensor being in fluid communication with the water solenoid valve and the water spray nozzle, the water pressure sensor detecting a low pressure of the water provided to the water spray nozzle and generating an electrical low water pressure signal in response thereto, the electronic circuit being responsive to the low water pressure signal and controlling the electrical communication between the source of electrical charge and the first cylindrical outer electrode and the second cylindrical inner electrode in response thereto.

23. A nitrogen-enriched water generator as defined by claim 1, which further comprises:
an air blower system, the air blower system constituting the source of positive pressure air coupled to the at least one air injection connection and constituting the source of negative pressure air coupled to the vacuum connection, the air blower system including an air pressure sensor in fluid communication with the at least one air injection port, the air pressure sensor detecting the pressure of air provided by the air blower system to the at least one air injection port and generating an electrical air pressure signal in response thereto; and
an electronic circuit, the electronic circuit being responsive to the air pressure signal generated by the air pressure sensor and controlling the electrical communication between the source of electrical charge and the first cylindrical outer electrode and the second cylindrical inner electrode in response thereto.

24. A nitrogen-enriched water generator as defined by claim 1, wherein the at least one air injection connection defines a first injection port and a second injection port spaced apart from the first injection port, each of the first injection port and the second injection port being in fluid communication with the second section of the sealed nitrogen/oxygen chamber, the at least one air injection connection being coupleable to the source of positive pressure air to inject the air through the first air injection port and the second air injection port into the second section and into the gap between the first cylindrical outer electrode and the second cylindrical inner electrode.

25. A nitrogen-enriched water generator as defined by claim 24, wherein the first air injection port is situated diametrically opposite the second air injection port.

26. A nitrogen-enriched water generator as defined by claim 24, wherein the at least one air injection connection is formed as a cylindrical band encircling or defining a portion of the elongated, sealed nitrogen/oxygen chamber housing.

27. A nitrogen-enriched water generator as defined by claim 24, wherein the first cylindrical outer electrode and the second cylindrical inner electrode have surfaces which face each other; and
wherein each of the first air injection port and the second air injection port is disposed at an angle offset from a radial axis of the housing at the second section of the sealed, nitrogen/oxygen chamber defined thereby so that the air injected into the gap between the first cylindrical outer electrode and the second cylindrical inner electrode is circulated therein in order to move arcs of the plasma within the gap so that the plasma arcs strike the facing surfaces of the first cylindrical outer electrode and the second cylindrical inner electrode at different locations thereon.

28. A nitrogen-enriched water generator as defined by claim 1, wherein the at least one air injection connection includes an upper air injection connection situated on the housing and a lower air injection connection situated on the housing and spaced axially from the upper air injection connection, the upper air injection connection defining an upper air injection port, the upper air injection port being in fluid communication with the second section of the sealed nitrogen/oxygen chamber, the upper air injection connection being coupleable to the source of positive pressure air to inject air through the upper air injection port into the second section and into the gap between the first cylindrical outer electrode and the second cylindrical inner electrode, the lower air injection connection defining a lower air injection port, the lower air injection port being in fluid communication with the second section of the sealed nitrogen/oxygen chamber, the lower air injection connection being coupleable to the source of positive pressure air to inject the air through the lower air injection port into the second section and into the gap between the first cylindrical outer electrode and the second cylindrical inner electrode.

29. A nitrogen-enriched water generator as defined by claim 28, wherein the first cylindrical outer electrode and the second cylindrical inner electrode are positioned axially in the housing between the upper air injection connection and the lower air injection connection.

30. A nitrogen-enriched water generator as defined by claim 28, wherein the upper air injection connection is formed as a first cylindrical band encircling or defining a portion of the elongated, sealed nitrogen/oxygen chamber housing; and
wherein the lower air injection connection is formed as a second cylindrical band encircling or defining a portion of the elongated, sealed nitrogen/oxygen chamber housing.

31. A nitrogen-enriched water generator as defined by claim 28, wherein the first cylindrical outer electrode and the second cylindrical inner electrode have surfaces which face each other; and
wherein each of the upper air injection port and the lower air injection port is disposed at an angle offset from a radial axis of the housing at the second section of the sealed, nitrogen/oxygen chamber defined thereby so that the air injected into the gap between the first cylindrical outer electrode and the second cylindrical inner electrode is circulated therein in order to move arcs of the plasma within the gap so that the plasma arcs strike the facing surfaces of the first cylindrical outer electrode and the second cylindrical inner electrode at different locations thereon.

\* \* \* \* \*